(No Model.)
J. F. STUCKERT.
AUTOMATIC FIRE EXTINGUISHER.
No. 395,856. Patented Jan. 8, 1889.
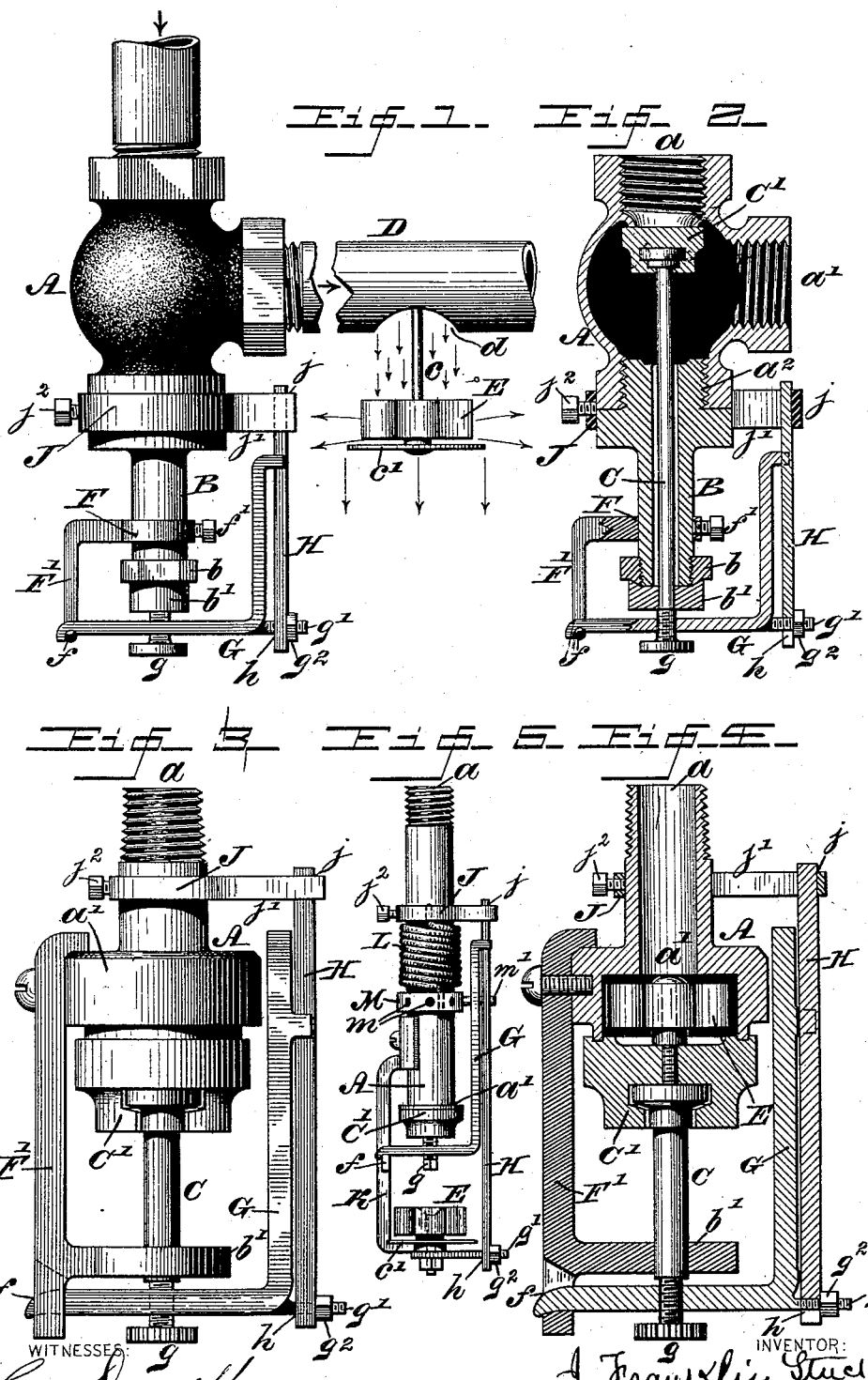

UNITED STATES PATENT OFFICE.

J. FRANKLIN STUCKERT, OF PHILADELPHIA, PENNSYLVANIA.

AUTOMATIC FIRE-EXTINGUISHER.

SPECIFICATION forming part of Letters Patent No. 395,856, dated January 8, 1889.

Application filed April 28, 1888. Serial No. 272,155. (No model.)

*To all whom it may concern:*

Be it known that I, J. FRANKLIN STUCKERT, a citizen of the United States, residing in the city and county of Philadelphia, State of Pennsylvania, have invented a new and useful Improvement in Automatic Fire-Extinguishers, which improvement is fully set forth in the following specification and accompanying drawings.

My invention relates to improvements in automatic fire-extinguishers, and the leading object of the invention is to provide an extinguisher which will be operated by heat to cause the water or extinguishing-fluid to be thrown in the flames.

A further object is to provide an automatic fire-extinguisher which will be the embodiment of simplicity, which will be thoroughly efficient in operation, easily applied in position, and inexpensive of production.

The invention consists in a valve-chamber, a valve for closing the inlet of said chamber, an angle arm or bracket for retaining the valve in a closed position, and a fusible connection adapted to be operated upon by heat for releasing the angle-arm and valve; further, in a valve-chamber, a valve for closing the inlet of said chamber, an angle arm or bracket for retaining the valve in its closed position, a fusible connection for the angle-arm to be released by heat, and a spraying device for throwing or spraying the water or fluid when the valve is opened; and, finally, the invention consists in the novel details of construction, combination, arrangement, and adaptation of the parts comprising the device, all as hereinafter described and specifically claimed.

Figure 1 represents a side elevation of an automatic fire-extinguisher embodying my invention. Fig. 2 represents a vertical sectional view thereof. Fig. 3 represents a side elevation of a modification of the invention. Fig. 4 represents a vertical sectional view thereof. Fig. 5 represents a side elevation of another modification of the invention.

Similar letters of reference indicate corresponding parts in the several figures.

Referring to the drawings, A represents the valve case or chamber, provided with an inlet-opening, $a$, and an outlet or discharge opening, $a'$, and also with an opening, $a^2$. In the opening $a^2$ is screwed the tube or sleeve B, in which the valve-stem C, carrying the valve C', is situated, the said valve C' normally closing the inlet $a$ of the valve case or chamber.

To the lower end of the tube or sleeve B is screwed a nut, $b$, and a guide, $b'$, for the valve-stem. Screwed into the discharge-opening of the valve-chamber is a pipe, D, provided with an opening, $d$, and arranged below said opening on a rod, $c$, carrying what may be termed a "splashing-disk," $c'$, is the spraying-wheel or turbine E.

If desired, the rod $c$ may be secured in the pipe D and depending through the opening $d$ therein, and thus receive a supply of water or fluid direct from the pipe, as clearly shown in Fig. 1 of the drawings.

F represents a collar or band embracing the tube or sleeve B, and having the angle-arm F' formed integral therewith, the angle-arm having a rounded end, $f$, the purpose of which will be seen, and the collar being retained in place on the tube by means of a set-screw, $f'$.

G represents an angle-arm having one end resting on the end $f$ of the arm F', and furnishing a bearing for the screw $g$, secured to the end of the stem C of the valve, whereby the valve is retained in position. The said angle-arm G has a threaded portion, $g'$, on which works the fusible nut $g^2$. The threaded portion or bolt $g'$ passes through the bifurcated lower end, $h$, of the bar H, the upper end of which bears against the inner face of the outer wall, $j$, of the extended open portion $j'$ of the collar J, which embraces the upper and lower ends, respectively, of the valve-case A and tube or sleeve B, and is retained in place by means of the set-screw $j^2$.

In the modification of the invention illustrated in Figs. 3 and 4 I provide an inlet-pipe, $a$, with an enlarged lower end, $a'$, and the valve-stem C carries the valve C', and the spraying or turbine wheel E being located in the enlarged end $a'$ and the valve C' normally closing said end, the other parts being of the same construction as employed in the device illustrated in Figs. 1 and 2 and operating in the same manner.

In the modification illustrated in Fig. 5 I employ an inlet-pipe, $a$, a bracket, K, which carries the turbine or spraying wheel E, and a spring, L, having an end secured in a collar, J, at its upper end and a collar M at its lower end, the collar M having openings $m$ for increasing the tension of the spring, a pin or stud, $m'$, being inserted in one of the openings for the purpose, and when the spring is tightened resting against the bar H.

From the foregoing description, taken in connection with the drawings, the operation of the invention will be readily understood, and is as follows: The inlet-opening normally is closed by the valve. When the heat comes in contact with the fusible connection, the same is melted or destroyed, causing the angle-arm and bar to fall, the valve-stem and valve to drop and open the inlet. The water or extinguishing-fluid then rushes through the discharge-pipe to the spraying-wheel, which throws the fluid into the flame, extinguishing the same in a very short time. The operation of the modification illustrated in Figs. 3 and 4 is substantially the same, except that the water flows direct from the inlet onto the spraying-wheel, the inlet also serving as a discharge-pipe. The operation of the modification illustrated in Fig. 5 is somewhat different. When the fusible connection is destroyed by the heat, the spring exerts its tension, causing the stud in the collar to throw the bar H out of its normal position and cause the angle-arm to drop and open the inlet-pipe, affording the same result as in the other devices.

It is evident that I provide a device which is automatic in operation, thoroughly efficient, neat and attractive in appearance, and inexpensive of production.

Having thus described my invention, what I claim as new, and desire to secure by Letters Patent, is—

1. A fire-extinguisher consisting of a valve-chamber with inlet and outlet passages, a valve controlling said inlet-passage, an angle-arm supporting the stem of the valve and having a screw attachment, a second angle-arm secured to an attachment of the chamber and having a rounded lower end, a collar secured to the valve-chamber and having an opening in one side, a bifurcated bar with its upper end in said side opening of the collar and its bifurcated end embracing the screw attachment, and a clamping-nut, substantially as described.

2. The combination of the chamber A, with an inlet and an outlet opening, a valve with stem C and screw $g$, a pipe secured to said chamber and having a discharge-opening, $d$, in one side thereof, the sleeve B, secured to said chamber A, the angle-arm F', secured to said sleeve B and having a rounded end, $f$, the angle-arm G, forming a bearing for the screw $g$ and having a threaded extension, $g'$, the bar H, with bifurcated end, and the fusible nut $g^2$, and a turbine below said discharge-opening $d$, substantially as described.

3. The valve-chamber A, with inlet-opening $a$, outlet-opening $a'$, and lower opening, $a^2$, the sleeve B, secured in said opening $a^2$, the discharge-pipe D, with opening $d$, a collar with extended opening $j'$ on its side, secured to said chamber and sleeve, the angle-arm F', secured to said sleeve B and provided with a round end, $f$, the angle-arm G, with end resting on the rounded end $f$ and forming a bearing for screw $g$, and provided with screw G', bar H, with upper end in opening $j'$ of collar and having bifurcated lower end, $h$, and the fusible nut $g^2$, said parts being combined, substantially as described.

J. FRANKLIN STUCKERT.

Witnesses:
JOHN A. WIEDERSHEIM,
THEO. C. WARNER.